US011187793B1

(12) United States Patent
Liu (10) Patent No.: US 11,187,793 B1
(45) Date of Patent: Nov. 30, 2021

(54) METHOD FOR TEMPORALLY CALIBRATING SENSOR STREAMS IN AN AUTONOMOUS VEHICLE

(71) Applicant: Direct Current Capital LLC, Wilmington, DE (US)

(72) Inventor: Lei Liu, Mountain View, CA (US)

(*) Notice: Subject to any disclaimer, the term of this patent is extended or adjusted under 35 U.S.C. 154(b) by 220 days.

(21) Appl. No.: 16/292,239

(22) Filed: Mar. 4, 2019

Related U.S. Application Data

(60) Provisional application No. 62/638,008, filed on Mar. 2, 2018.

(51) Int. Cl.
| G01S 7/497 | (2006.01) |
| G05D 1/00 | (2006.01) |
| G05D 1/02 | (2020.01) |
| G07C 5/08 | (2006.01) |
| G01S 17/931 | (2020.01) |

(52) U.S. Cl.
CPC ............ G01S 7/497 (2013.01); G01S 17/931 (2020.01); G05D 1/0055 (2013.01); G05D 1/0088 (2013.01); G05D 1/0214 (2013.01); G05D 1/0246 (2013.01); G07C 5/08 (2013.01); G05D 2201/0213 (2013.01)

(58) Field of Classification Search
CPC combination set(s) only.
See application file for complete search history.

(56) References Cited

U.S. PATENT DOCUMENTS

| 9,121,866 | B2 * | 9/2015 | Demerly | G01P 21/00 |
| 9,297,899 | B2 * | 3/2016 | Newman | G01S 17/02 |
| 10,732,262 | B2 * | 8/2020 | Ru | G01S 7/4052 |
| 10,746,858 | B2 * | 8/2020 | Bradley | G01S 7/4972 |
| 10,766,468 | B2 * | 9/2020 | Zhang | B60T 8/17551 |

* cited by examiner

*Primary Examiner* — Thomas G Black
*Assistant Examiner* — Anthony M Gartrelle
(74) *Attorney, Agent, or Firm* — Polsinelli PC (57) ABSTRACT

One variation of a method for temporally calibrating sensor streams in an autonomous vehicle includes: deriving a first set of longitudinal velocities of a reference point on the autonomous vehicle from a sequence of inertial data recorded over a period of time; deriving a second set of longitudinal velocities of the reference point based on features detected in a set of LIDAR frames recorded during the period of time; calculating a LIDAR sensor offset time that approximately minimizes a difference between the first set of longitudinal velocities and the second set of longitudinal velocities; and, in response to the LIDAR sensor offset time approximating an previous LIDAR sensor offset time, verifying operation of the LIDAR sensor during the first period of time.

20 Claims, 4 Drawing Sheets

*FIG. 5*

METHOD FOR TEMPORALLY CALIBRATING SENSOR STREAMS IN AN AUTONOMOUS VEHICLE

CROSS-REFERENCE TO RELATED APPLICATIONS

This Application claims the benefit of U.S. Provisional Application No. 62/638,008, filed on 2 Mar. 2018, which is incorporated in its entirety by this reference.

TECHNICAL FIELD

This invention relates generally to the field of autonomous vehicles and more specifically to a new and useful method for temporally calibrating sensor streams in an autonomous vehicle in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
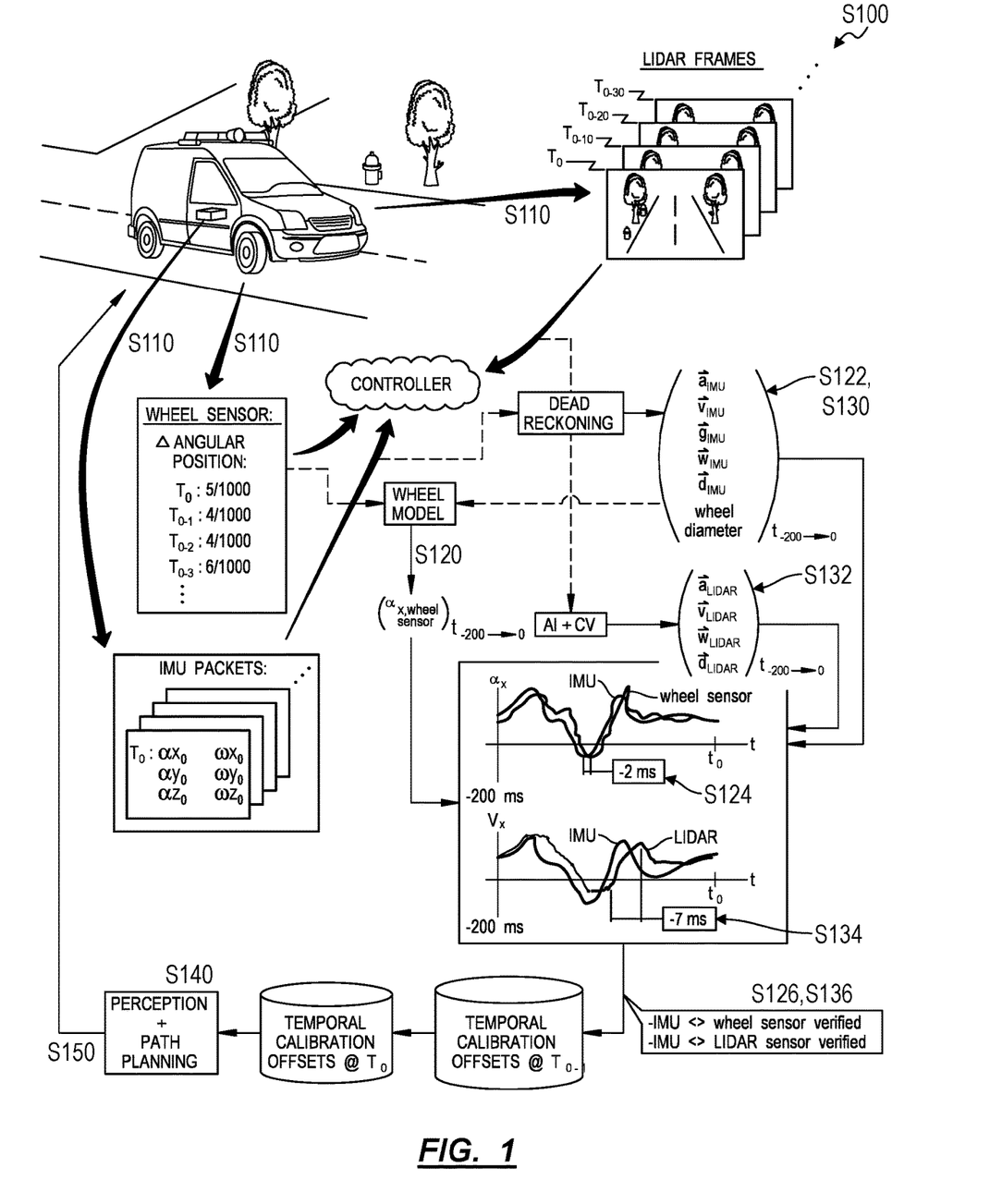
FIG. 1 is a flowchart representation of a method.

As shown in FIG. 1, a method S100 for temporally calibrating sensor streams in an autonomous vehicle includes: recording sensor streams from an inertial measurement sensor package (or "IMU"), a wheel sensor, and a LIDAR sensor in the autonomous vehicle in Block S110, the wheel sensor coupled to a first wheel in the autonomous vehicle; deriving longitudinal accelerations of the autonomous vehicle at the first wheel from data output by the IMU over a first period of time up to a current time in Block S120; deriving longitudinal accelerations of the autonomous vehicle at the first wheel from data output by the wheel sensor approximately over the first period of time in Block S122; calculating a wheel sensor offset time that approximately minimizes a difference between longitudinal accelerations at the first wheel derived from data output by the IMU and longitudinal accelerations at the first wheel derived from data output by the wheel sensor in Block S124; deriving longitudinal velocities of the autonomous vehicle at a reference point from data output by the IMU and the wheel sensor over a second period of time up to the current time in Block S130; deriving longitudinal velocities of the autonomous vehicle at the reference point from LIDAR frames output by the LIDAR sensor approximately over the second period of time in Block S132; calculating a LIDAR sensor offset time that approximately minimizes a difference between longitudinal velocities at the reference point derived from data output by the IMU and longitudinal velocities at the reference point derived from LIDAR frames output by the LIDAR sensor in Block S134; and compiling a current LIDAR frame, a particular datum output by the IMU sensor and associated with a time offset from the LIDAR frame by approximately the LIDAR sensor offset time, and a particular datum output by the wheel sensor and associated with a time offset from the particular datum output by the IMU sensor by approximately the wheel sensor offset time in Block S140.

As shown in FIGS. 2-5, one variation of the method S100 includes: deriving a first set of longitudinal accelerations at a first wheel of the autonomous vehicle from a first sequence of inertial data received from an inertial sensor in the autonomous vehicle over a first period of time up to approximately a first time in Block S120; deriving a second set of longitudinal accelerations at the first wheel from a first sequence of angular position changes output by a wheel sensor, coupled to the first wheel, approximately over the first period of time in Block S122; and calculating a first wheel sensor offset time that approximately minimizes a first difference between the first set of longitudinal accelerations and the second set of longitudinal accelerations in Block S124. The method S100 also includes: deriving a first set of longitudinal velocities of a reference point on the autonomous vehicle from a second sequence of inertial data received from the inertial sensor over a second period of time between an initial time and the first time in Block S130; deriving a second set of longitudinal velocities of the reference point on the autonomous vehicle based on features detected in an initial LIDAR frame received from the LIDAR sensor at the initial time and features detected in a first LIDAR frame received from the LIDAR sensor at the first time in Block S132; and calculating a first LIDAR sensor offset time that approximately minimizes a second difference between the first set of longitudinal velocities and the second set of longitudinal velocities in Block S134. The method S100 further includes generating a first representation of the autonomous vehicle and a field around the autonomous vehicle at the first time in Block S140 by compiling: the first LIDAR frame; a first inertial sensor datum, in the first sequence of inertial data, associated with a first inertial sensor receipt time offset from the first time by approximately the first LIDAR sensor offset time; and a first wheel sensor datum, in the first sequence of angular position changes, associated with a first wheel sensor receipt time offset from the first inertial sensor receipt time by approximately the first wheel sensor offset time.

Yet another variation of the method S100 includes: deriving a first set of longitudinal accelerations at a first wheel of the autonomous vehicle from a first sequence of inertial data received from an inertial sensor in the autonomous vehicle over a first period of time up to approximately a first time in Block S120; deriving a second set of longitudinal accelerations at the first wheel from a first sequence of angular position changes output by a wheel sensor, coupled to the first wheel, approximately over the first period of time in Block S122; calculating a first wheel sensor offset time that approximately minimizes a first difference between the first set of longitudinal accelerations and the second set of longitudinal accelerations in Block S124. The method S100 also includes: deriving a first set of longitudinal velocities of a reference point on the autonomous vehicle from a second sequence of inertial data received from the inertial sensor over a second period of time between an initial time and the first time in Block S130; deriving a second set of longitudinal velocities of the reference point on the autonomous vehicle based on features detected in an initial LIDAR frame received from the LIDAR sensor at the initial time and features detected in a first LIDAR frame received from the LIDAR sensor at the first time in Block S132; calculating a first LIDAR sensor offset time that approximately minimizes a second difference between the first set of longitudinal velocities and the second set of longitudinal velocities in Block S134. The method S100 further includes: in response to the first wheel sensor offset time approximating an initial wheel sensor offset time calculated prior to the first time, verifying operation of the inertial sensor during the first period of time in Block S126; in response to the first LIDAR sensor offset time approximating an initial LIDAR sensor offset time calculated prior to the first time, verifying operation of the LIDAR sensor during the first period of time in Block S136; and, in response to verifying operation of the inertial sensor and the LIDAR sensor during the first period of time, electing a first navigational action based on the first sequence of inertial data and the first LIDAR frame and executing the first navigational action in Block S150.

2. Applications

Generally, an autonomous road vehicle (hereinafter the "autonomous vehicle") can execute Blocks of the method S100 to temporally calibrate multiple data streams of sensors of different types arranged throughout the autonomous vehicle. In particular, sensors of different types arranged throughout the vehicle can exhibit different internal latencies between detection of a signal and transformation of this signal into an electrical or optical output, and these internal latencies may vary over time. These sensors may also communicate with a controller in the autonomous vehicle through various communication protocols that may exhibit different latencies, and these communication latencies may also vary over time, such as due to wear, debris, internal data load, and/or load on a data bus. Therefore, sensor data received by the controller concurrently may not have been generated concurrently by sensors throughout the autonomous vehicle, may not represent motion of the autonomous vehicle at the same instant in time, and/or may not represent the field around the autonomous vehicle at the same instant in time. The autonomous vehicle can therefore implement Blocks of the method S100: to derive temporal offsets between outputs of these sensors through a comparison of these outputs; and to repackage data from these sensors according to these temporal offsets. The autonomous vehicle can then calculate its trajectory and geospatial location from these temporally-aligned sensor data, process these temporally-aligned sensor data to perceive its surroundings, and calculate a next navigational action (e.g., accelerator, brake, and steering positions) according to its planned navigation path and its surroundings.

More specifically, time from detection of a signal by a sensor to receipt of an electronic (i.e., an analog or digital) representation of this signal at a controller in the autonomous vehicle may be unique to each sensor type (or "sensor modality," "sensor domain")—or even to each individual sensor—in the autonomous vehicle. For example, sensors of various types in the autonomous vehicle may package and transmit data to the controller over different durations of time due to: output of a drive signal (e.g., photos, a laser beam) over a non-zero period of time; collection of a signal (e.g., photons) over a non-zero period of time; and/or transformation of a raw signal into a digital signal or data package (e.g., a 3D depth map). Sensors on the autonomous vehicle may also be connected to the controller via a CAN bus, an Ethernet connection, a serial bus, and/or other communication modalities, all of which may exhibit different bandwidth constraints and different latencies. Furthermore, sensors of the same type and configuration may output data with temporal differences, such as due to manufacturing defects; these sensors may also exhibit changes in their temporal output characteristics over time, such as over both short time scales (e.g., seconds due to local temperature changes) and long time scales (e.g., years due to wear).

Furthermore, the autonomous vehicle may navigate at speeds of 40 meters per second (and greater) during regular operation. When navigating at such speeds, if the controller attempts to merge two sensor streams that are temporally misaligned—such as by as little as one millisecond—these sensor streams may contain data that: disagree by several centimeters in the absolute position of the autonomous vehicle; disagree by meters per second in the velocity of the autonomous vehicle; disagree by meters per second-squared in the acceleration of the autonomous vehicle; or disagree in the absolute position, velocity, or acceleration of an external object in the field around the autonomous vehicle. More specifically, when the autonomous vehicle is moving at speed during normal operation, even small differences in times that sensor data from sensors of different types (and from different sensors of the same type) were recorded and subsequently communicated to the controller may introduce significant error in the autonomous vehicle's interpretation of its environment, objects moving in its environment, and/or its own motion within its environment.

Because times from detection of a signal at a sensor to receipt of data—representing this signal from a sensor—at the controller may also vary nonlinearly or unpredictably over time for some or all sensors in the autonomous vehicle, fixed temporal calibration values for temporally aligning these sensor streams may be insufficient to achieve centimeter-level perception of the field around the autonomous vehicle. Therefore, the autonomous vehicle can implement Blocks of the method S100 to regularly compare sensor streams from sensors of different types, to extract temporal offsets between these sensor streams, and to realign sensor streams based on these temporal offsets.

3. Example

In one implementation shown in FIG. 1, the autonomous vehicle includes an IMU, a wheel sensor, and a LIDAR sensor. For example, an IMU can detect and output sensor signals representing accelerations along three perpendicular axes and angular velocities about these three perpendicular axes; these sensor signals may therefore describe changes in the autonomous vehicle's linear velocity and how the autonomous vehicle is rotating. A wheel sensor coupled to one wheel of the autonomous vehicle can output sensor signals representing changes in angular position of the wheel. The controller can combine these changes in angular position of the wheel with times between these sensor signals and a diameter of the wheel to estimate a change in position of the autonomous vehicle at the wheel, a velocity of the autonomous vehicle in the direction of the wheel, and/or acceleration of the autonomous vehicle in the direction of the wheel.

A LIDAR sensor can output 3D depth images (hereinafter "LIDAR frames") containing points that represent distances from the LIDAR sensor to points on surfaces in the field of view of the LIDAR sensor (i.e., in the field around the autonomous vehicle). The controller can derive changes in the position and orientation of the LIDAR sensor in real space, the LIDAR sensor's linear and angular speed, and the LIDAR sensor's linear accelerations along multiple axes, etc. from changes in positions of immutable (e.g., static) objects detected in a sequence of LIDAR frames.

These sensors can also output sensor signals at different rates. For example, the IMU can output acceleration and angular velocity data at a rate of 500 Hz (or 1000 Hz), the wheel sensor can output wheel displacement data at a rate of 50 Hz (or 100 Hz), and the LIDAR sensor can output LIDAR frames at a rate of 10 Hz (or 20 Hz).

To temporally align data output by the IMU and the wheel sensor, the controller can: select the IMU sensor as the reference sensor (e.g., given the greatest frequency of data output by the IMU and opportunity to reject noise from these higher-frequency data); derive like motion data—such as speed of the autonomous vehicle at the wheel and parallel to the longitudinal axis of the autonomous vehicle—over a period of time (e.g., 200 milliseconds) up to the current time from signals received from the IMU and the wheel sensor; and calculate a first target temporal offset that, when applied to motion data derived from signals received from the wheel sensor, minimizes a difference between these motion data derived from wheel sensor signals and motion data derived from IMU signals. The controller can implement similar methods and techniques: to derive like motion data over a period of time up to the current time from signals received from the IMU and the LIDAR sensor; and to calculate a second target temporal offset that, when applied to the motion data derived from LIDAR frames, minimizes a difference between these motion data derived from LIDAR frames and motion data derived from IMU signals.

Based on these temporal offsets, the controller can then: select one data packet from the IMU (e.g., one set of linear accelerations and one set of angular velocities); select one data packet received from the wheel sensor and associated with a time offset from the inertial data packet by the first temporal offset (or offset by a temporal offset between the first temporal offset and a similar temporal offset calculated during a previous calibration cycle); select one LIDAR frame received from the LIDAR sensor and associated with a time offset from the inertial data packet by the second temporal offset (or offset by a temporal offset between the second temporal offset and a similar temporal offset calculated during a previous calibration cycle); and compile these data packets and LIDAR frame(s) into a more comprehensive—and more temporally accurate—representation of the field around the autonomous vehicle and/or its motion within this field.

Similarly, the autonomous vehicle can feed these temporal offsets forward to a next calibration cycle in order to inform comparison and alignment of brief segments of sensor data subsequently received from these sensors. (Similarly, the autonomous vehicle can feed linear combinations of current and preceding temporal offsets—calculated during previous calibration cycles—forward to a next calibration cycle in order to inform comparison and alignment of sensor data subsequently received from these sensors while reducing opportunity for error or uncorrected drift in these derived temporal offsets over time.)

Furthermore, if the system calculates a temporal offset—between motion data derived from sensor streams output by sensors of two different types (e.g., IMU and wheel speed; IMU and LIDAR sensor) in the autonomous vehicle—that exceeds a threshold difference, the autonomous vehicle can: flag these sensors for possible malfunction; trigger the autonomous vehicle to execute a pullover routine; prompt a remote operator to assume manual control of the autonomous vehicle; or reduce a maximum autonomous operating speed of the autonomous vehicle (e.g., to less than 10 miles per hour) accordingly.

4. IMU Sampling and Temporal Error

The autonomous vehicle can include an IMU configured to output sensor data representative of motion of the autonomous vehicle at a relatively high sampling rate. For example, the IMU can output sensor signals or discrete data packets at a rate of 500 Hz (or 1000 Hz), wherein each sensor signal or discrete data packet represents: acceleration of the autonomous vehicle along each of three perpendicular axes; and angular velocity of the autonomous vehicle about each of these three axes.

However, time from detection of accelerations and angular velocities at the IMU, generation of these electrical sensor signals (e.g., discrete data packets) at the IMU, transmission of these sensor signals (e.g., in analog or digital format) to the controller, and finally receipt of these sensor signals at the controller may be non-negligible. For example, the IMU may generate these electrical sensor signals over a non-negligible duration of time prior to transmission to the controller; and the IMU can be connected to the controller via a USB connection, which may be characterized by bandwidth constraints and may therefore exhibit some non-negligible data transfer latency. Furthermore, upon receipt of these sensor signals from the IMU (e.g., via the USB connection), the controller can store, recompile, and interpret these sensor signals over an additional non-negligible interval before executing a calibration routine or otherwise processing these sensor signals in preparation for electing and executing a next navigational action.

Upon receipt from the IMU, the controller can timestamp these sensor signals, but these timestamps may not compensate for latency in generation and then transmission of these sensor signals at the IMU, including latencies from: motion of the autonomous vehicle that produces these sensor signals; transmission of these signals to the controller; and interpretation of these signals by the controller. The sum of these latencies is represented herein as "$d_{t,IMU}$."

Alternatively, for the IMU that outputs these signals in timestamped data packets, a timestamp stored in a data packet output by the IMU may still fail to compensate for a non-negligible period of time over which the IMU transformed detected motion of the autonomous vehicle into this data packet. This latency is represented herein as "$d_{t,IMU}$." Therefore, for a sensor signal generated by the IMU and representing accelerations and angular velocities of the autonomous vehicle at time $t_0$, the controller may receive this sensor signal (and may be prepared to process this signal) at the sum of $t_0$ and $d_{t,IMU}$—which is represented herein as "$t_{IMU}$." For example, $d_{t,IMU}$ may approximately equal 500 microseconds and may be approximately constant or otherwise exhibit relatively small variance over long time intervals.

Therefore, the autonomous vehicle can regularly receive acceleration and angular velocity values from the IMU (e.g., at a rate of 500 Hz during operation of the autonomous vehicle). The autonomous vehicle can also store IMU sensor data collected over some duration of time (e.g., 200 milliseconds) in a buffer for subsequent comparison to wheel sensor and LIDAR frames, as described below.

5. Wheel Sensor Sampling and Temporal Error

The autonomous vehicle can also include a wheel sensor coupled to a wheel of the autonomous vehicle and configured to output a sensor signal representing an absolute position of the wheel or representing a change in the angular position of the wheel. For example, the wheel sensor can include a 1000-point encoder that directly outputs "ticks" to the controller via a CAN bus, which may exhibit a data transfer latency that differs from that of the USB connection between the IMU and controller. In another example, the wheel sensor can generate and output data packets at a rate of 50 Hz, wherein each data packet contains a value representing a number of ticks detected by the wheel sensor since a last data packet was generated; the wheel sensor can then serve each data packet to the controller via the CAN bus. Similarly, like inertial data packets, the controller can read wheel position data from the wheel sensor—such as at a rate of 50 Hz or 100 Hz—during operation of the autonomous vehicle and can store wheel position data collected over some duration of time (e.g., 200 milliseconds) in a buffer. Total latencies inherent in this data collection and communication process from the wheel sensor to the controller is represented herein as "$d_{t,WS}$."

Therefore, for a sensor signal generated by the wheel sensor and representing angular displacement of the wheel at time $t_0'$, the controller may receive this sensor signal (and may be prepared to process this signal) at the sum of $t_0'$ and $d_{t,WS}$— which is represented hereinafter as "$t_{WS}$." For example, $d_{t,WS}$ may exceed $d_{t,IMU}$ by an average of two milliseconds during normal operation of the autonomous vehicle. More specifically, a data output and transfer latency characteristic of the wheel sensor may exceed a data generation and transfer latency characteristic of the IMU by an average of two milliseconds during normal operation of the autonomous vehicle.

6. LIDAR Sampling and Temporal Error

The autonomous vehicle can also include a LIDAR sensor configured to generate and output LIDAR frames (or "3D depth maps") that contain 3D clouds of points that represent distances from the LIDAR sensor to points on surfaces in the field of view of the LIDAR sensor. For example, the LIDAR sensor can include a scanning LIDAR sensor containing optical emitters and a column of optical sensors configured to rotate about an axis. However, illuminating surfaces in the field around the LIDAR sensor with the optical emitters, detecting reflected light from these surfaces in the field at many optical sensors while rotating the column of optical sensors through a full rotation about the axis, interpreting this reflected light as distance values for each optical sensor at many angular positions about the axis, and compiling these distance values into a 3D point cloud or other 3D representation of these surfaces in the field may occur (at the LIDAR sensor) over a non-negligible duration of time, such as approximately 50 milliseconds for a LIDAR sensor operating at 20 Hz. For example, the LIDAR sensor can timestamp this LIDAR frame before outputting the timestamped LIDAR image to the controller. However, the timestamp of this LIDAR image: may differ slightly from the time that a last optical sensor in a last angular position about the axis received reflected light from a surface in the field of view of the last optical sensor in this last angular position; and may differ greatly from the time that a first optical sensor in a first angular position about the axis received reflected light from a surface in the field of view of the first optical sensor in this first angular position during one rotation cycle of the LIDAR sensor. This latency (e.g., a maximum latency, a minimum latency, an average latency) is represented herein as "$d_{t,LIDAR}$."

The LIDAR sensor can also be coupled to the controller via an Ethernet or optical data connection, which may be characterized by high bandwidth and low latency relative to the USB connection that links the controller to the IMU and relative to the CAN bus that links the controller to the wheel sensor. However, LIDAR frames recorded by the LIDAR sensor may be relatively large in size such that transmission of a LIDAR frame from the LIDAR sensor to the controller via the Ethernet connection may also span a non-negligible duration of time. Thus, $d_{t,LIDAR}$ can represent a time of transmission of a LIDAR frame to the controller in addition to a delay from scanning the field around the LIDAR sensor to generation of this LIDAR frame.

Therefore, for a LIDAR frame generated by the LIDAR sensor and representing distances from the LIDAR sensor to points in a field around the autonomous vehicle at time $t_0''$, the controller may receive this LIDAR frame at the sum of $t_0''$ and $d_{t,LIDAR}$—which is represented hereinafter as $t_{LiDAR}$. For example, $d_{t,LIDAR}$ may exceed $d_{t,IMU}$ by an average of five milliseconds. More specifically, a data output and transfer latency characteristic of the LIDAR sensor may exceed a data generation and transfer latency characteristic of the IMU by an average of five milliseconds during normal operation of the autonomous vehicle.

Furthermore, the controller can receive LIDAR images from the LIDAR sensor (e.g., at a rate of 20 Hz during operation of the autonomous vehicle) and store LIDAR frames received over a duration of time (e.g., 200 milliseconds) in a buffer, such as described above.

7. IMU as Reference

Generally, in an implementation in which the IMU operates at a first sampling rate (e.g., 500 Hz, 1000 Hz) greater than a second sampling rate of the wheel sensor (e.g., 50 Hz, 100 Hz) and greater than a third sampling rate of the LIDAR sensor (e.g., 10 Hz, 20 Hz), the controller can execute Blocks of the method S100 to calibrate the IMU, wheel sensor, and LIDAR sensor with the output of the IMU functioning as a baseline signal for locating the wheel sensor signals and LIDAR frames in time.

In particular, in the implementation in which the IMU outputs inertial data at a sampling rate that is faster than the sampling rates of the wheel sensor and the LIDAR sensor, the controller can handle signals received from the IMU as reference signals and can execute Blocks of the method S100 to temporally calibrate the wheel sensor and the LIDAR sensor relative to the IMU, including: filtering high-frequency inertial data to reject noise in this baseline signal; comparing medium-frequency wheel sensor data to filtered, high-frequency inertial data to find a best $d_{t,WS}$ that minimizes differences between these signals in Block S124; and comparing low-frequency LIDAR data to filtered, high-frequency inertial data to find a best $d_{t,LIDAR}$ that minimizes differences between these signals in Block S134.

However, in variations of the autonomous vehicle that include another combination of sensors (e.g., IMU, camera, LIDAR, and RADAR) and/or include sensors that output data at different frequencies or sampling rates, the controller can similarly handle a highest-frequency signal output by one of these sensors as a baseline signal for temporally locating sensor signals from other sensors on the autonomous vehicle.

8. Temporal Offset: Wheel Sensor to IMU

Block S120 of the method S100 recites deriving a first set of longitudinal accelerations at a first wheel of the autonomous vehicle from a first sequence of inertial data received from an IMU in the autonomous vehicle over a first period of time up to approximately a first time; Block S122 of the method S100 recites deriving a second set of longitudinal accelerations at the first wheel from a first sequence of angular position changes output by a wheel sensor, coupled to the first wheel, approximately over the first period of time; and Block S124 of the method S100 recites calculating a first wheel sensor offset time that approximately minimizes a first difference between the first set of longitudinal accelerations and the second set of longitudinal accelerations.

Generally, in Blocks S120 and S122, the autonomous vehicle derives new synthetic data streams—in a common domain (e.g., longitudinal acceleration at the wheel sensor or wheel)—from original inertial data packets received from the IMU and wheel sensor data received from the wheel sensor over a period of time (e.g., 200 milliseconds). With these new synthetic data streams from the IMU and the wheel sensor now in the same domain, the autonomous vehicle compares these new data streams to determine a temporal offset between these two synthetic data streams in Block S124.

Figure 2:
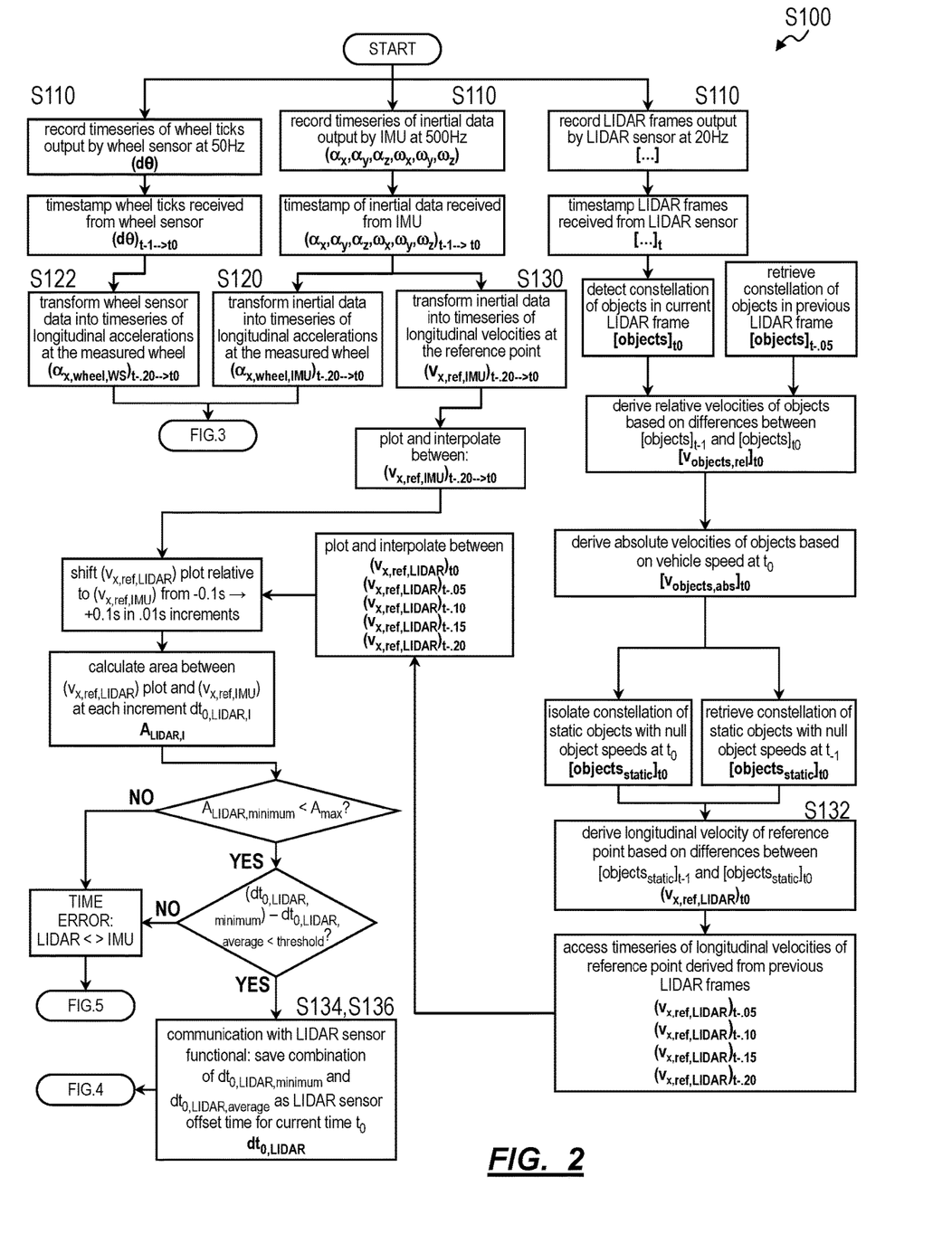
FIG. 2 is a flowchart representation of one variation of the method.
Figure 3:
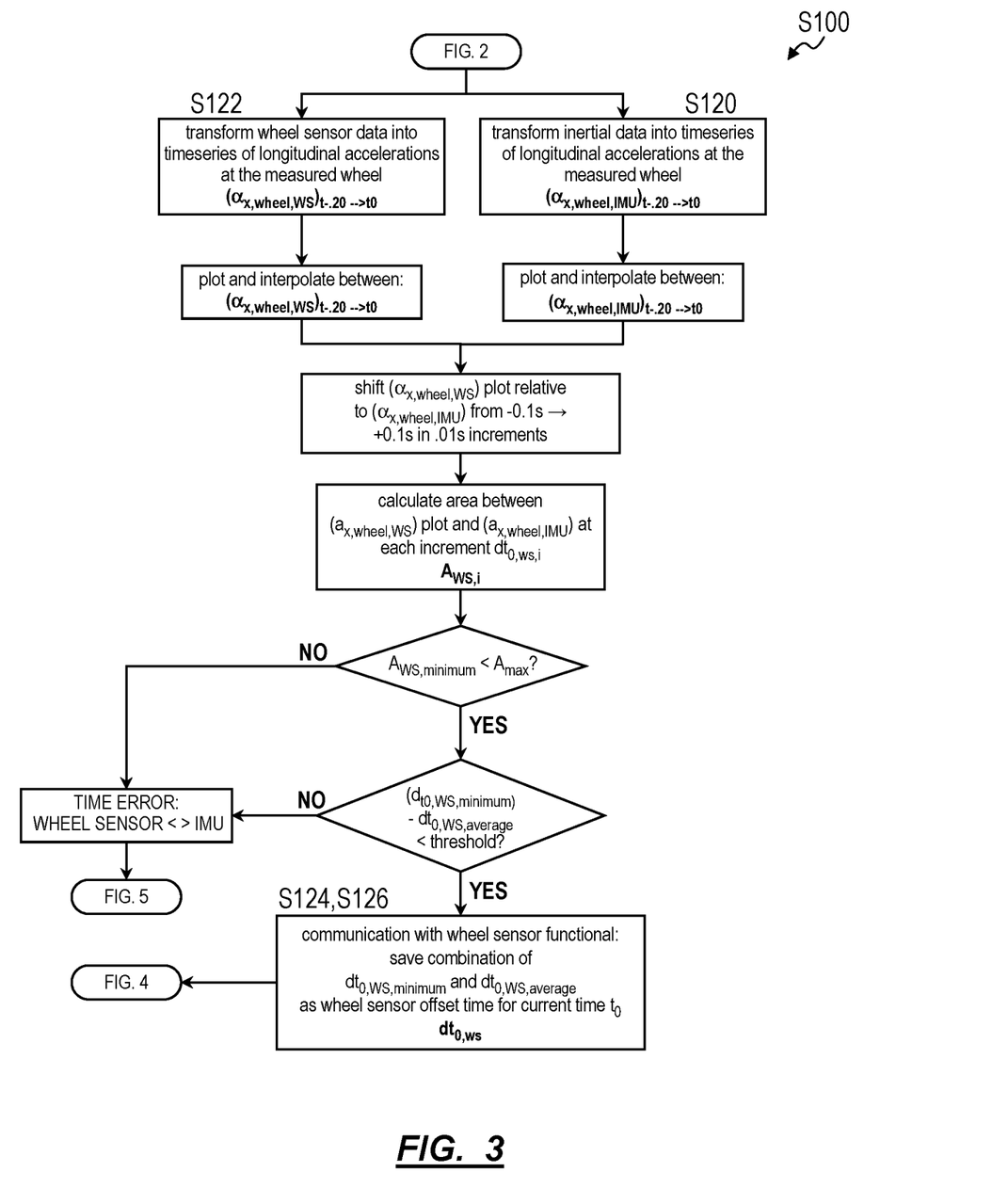
FIG. 3 is a flowchart representation of one variation of the method.

For example and as shown in FIGS. 2 and 3, the controller can: derive a wheel sensor-based synthetic data stream and an IMU-based synthetic data stream in a longitudinal acceleration domain at the wheel based on a known offset between the IMU and the wheel in Blocks S120 and S122; offset the wheel sensor-based synthetic data stream from the IMU-based synthetic data stream by a last wheel sensor offset time (or a combination of past wheel sensor offset times) calculated by the controller for these sensors; calculate an area between these two synthetic data streams; shift the wheel sensor-based synthetic data stream in time relative to the IMU-based synthetic data stream; recalculate areas between these two synthetic data streams at these different offset times; and store a particular offset time that yields a minimum area between these two synthetic data streams at these different offset times in Block S124.

8.1 IMU Data

In Block S120, the autonomous vehicle can implement dead reckoning techniques to transform linear accelerations and angular velocities received from the IMU (e.g., from $t_{0-200\ ms}$ to $t_0$ and stored in the buffer) into: directions of gravity; linear accelerations along pitch, yaw, and roll axes of the IMU, now decoupled from gravity; longitudinal directions of motion of the IMU; velocities of the IMU in the longitudinal direction of motion; and/or distances traversed by the IMU; etc. over the duration of the buffer.

The autonomous vehicle can then implement a wheel transform—representing a known offset from the IMU to the measured wheel coupled to the wheel sensor—to project the foregoing values onto the position of the measured wheel. The autonomous vehicle can also implement a stored wheel motion model (e.g., parametric function) to transform the foregoing IMU-derived data—such as vehicle speed and angular velocity of the IMU about a yaw axis—and a last measured tire pressure of the measured wheel into an estimate of the diameter of the measured wheel at $t_0$.

The autonomous vehicle can additionally or alternatively implement a reference transform—representing a known offset from the IMU to a reference point on the autonomous vehicle—to project the foregoing IMU-derived values onto the reference point.

8.2 Wheel Sensor Data

As described above, the wheel sensor can output an absolute position of the measured wheel or a change in angular position of the wheel. The autonomous vehicle can divide changes in position of the wheel (e.g., from $t_{0-200\ ms}'$ to $t_0'$ and stored in the buffer) by time intervals between receipts of these wheel position changes received from the wheel sensor to calculate angular velocities of the wheel over the duration of the buffer. The autonomous vehicle can then multiply these angular velocities of the wheel by a diameter of the wheel—estimated based on approximately concurrent inertial data, as described above—to estimate a ground speed of the autonomous vehicle at the wheel over the duration of the buffer. The autonomous vehicle can also calculate a derivative of this ground speed at the measured wheel to estimate acceleration at the wheel in the longitudinal direction over the duration of the buffer.

In a similar implementation, the controller can: estimate angular velocities of the measured wheel during this period of time based on rates of angular position changes of the first wheel represented in the current sequence of angular position changes stored in the buffer (e.g., the last 200 milliseconds); retrieve a last tire pressure measured by a tire pressure sensor coupled to the measured wheel; and estimate a diameter of the measured wheel during this period of time based on average angular velocity of the measured wheel and the tire pressure of the measured wheel during this period of time. The controller can then: estimate a longitudinal distance traversed by the first wheel during the first period of time based on the first angular velocity of the first wheel, the first diameter of the first wheel, and a steering angle of the autonomous vehicle during the first period of time; and derive a sequence of longitudinal accelerations of the autonomous vehicle at the first wheel during this period of time based on the longitudinal distance traversed by the first wheel during the first period of time.

8.3 Comparison

The autonomous vehicle can then compare: IMU-derived accelerations of the autonomous vehicle at the wheel in the longitudinal direction as a function of time over the duration of the buffer (e.g., 200 milliseconds up to the current time); and wheel-sensor-derived accelerations of the autonomous vehicle at the wheel in the longitudinal direction as a function of time over the same period of time. With the IMU-derived accelerations as reference, the autonomous vehicle can: select an offset time test value within a preset range (e.g., −10 milliseconds in a range from −10 milliseconds to +10 milliseconds with 1-milliseconds steps); shift the wheel-sensor-derived accelerations along the IMU-derived accelerations by the offset time test value; calculate area between the IMU-derived accelerations and the adjusted wheel-sensor-derived accelerations; and repeat this process for each other offset time test value in the preset range. The autonomous vehicle can then store a particular offset time test value—in this preset range—that minimizes the area between the IMU-derived accelerations and the wheel-sensor-derived accelerations as "$d_{WS\_IMU,i,initial}$."

In a similar example, the controller can: generate a first plot of longitudinal accelerations at the measured wheel derived from inertial data collected during the current period of time (e.g., the current 200 milliseconds of inertial data stored in the buffer); generate a second plot of longitudinal accelerations at the measured wheel derived from wheel sensor data collected during the current period of time (e.g., the current 200 milliseconds of wheel sensor data stored in the buffer); sequentially shift the first plot relative to the second plot in time by a predefined set of test times; calculate areas between the first plot and the second plot for each of these test times; and finally store a particular test time that minimizes the area between the first plot and the second plot as the current wheel sensor offset time—or $d_{WS\_IMU,i,initial}$—in Block S124.

However, the autonomous vehicle can implement any other method or technique to calculate a correlation between IMU- and wheel sensor-derived accelerations over the duration of the buffer.

8.4 Final Offset Time: IMU and Wheel Sensor

The autonomous vehicle can then: access a final offset time $d_{WS\_IMU,i-1,final}$ calculated during a preceding calibration cycle; and calculate a combination of the preceding final offset time value $d_{WS\_IMU,i-1,final}$ and the current offset time test value $d_{WS\_IMU,i,initial}$. For example, the autonomous vehicle can calculate a weighted average of $d_{WS\_IMU,i-1,final}$ and $d_{WS\_IMU,i,initial}$ with the preceding former value weighted more than the latter in order to filter noise from calculated offset times and in order to reliably converge on a correct solution to real latency difference between receipt of inertial data and wheel sensor data. The autonomous vehicle can store this combination as a final offset time value $d_{WS\_IMU,i,final}$ for the current calibration cycle.

In a similar example, the controller can: find or calculate a particular offset time test value that minimizes the area between the IMU-derived accelerations and the wheel-sensor-derived accelerations for the current time period (or "$d_{WS\_IMU,i,initial}$"); combine this particular offset time with previous offset times found or calculated during multiple (e.g., 100) previous calibration intervals, such as a weighted average or other linear combination of these offset times, including assigning the greatest weight to current offset time $d_{WS\_IMU,i,initial}$; and then store this combination of offset times as the final offset time—or $d_{WS\_IMU,i,final}$—for the current calibration interval.

(Alternatively, the autonomous vehicle can directly store the current offset time test value $d_{WS\_IMU,i,initial}$ for the current calibration cycle as $d_{WS\_IMU,i,final}$.)

9. Temporal Offset: LIDAR Frame to IMU

Block S130 of the method S100 recites deriving a first set of longitudinal velocities of a reference point on the autonomous vehicle from a second sequence of inertial data received from the IMU over a second period of time between an initial time and the first time; Block S132 of the method S100 recites deriving a second set of longitudinal velocities of the reference point on the autonomous vehicle based on features detected in an initial LIDAR frame received from the LIDAR sensor at the initial time and features detected in a first LIDAR frame received from the LIDAR sensor at the first time; and Block S134 of the method S100 recites calculating a first LIDAR sensor offset time that approximately minimizes a second difference between the first set of longitudinal velocities and the second set of longitudinal velocities.

Generally, in Blocks S130 and S132, the autonomous vehicle derives new synthetic data streams—in a common domain (e.g., longitudinal velocity at a reference point on the autonomous vehicle)—from original inertial data packets received from the IMU and LIDAR frames received from the LIDAR sensor over a period of time (e.g., 200 milliseconds). With these new synthetic data streams from the IMU and LIDAR sensor now in the same domain, the autonomous vehicle compares these new data streams to calculate a temporal offset between these two synthetic data streams in Block S134, as shown in FIG. 2.

9.1 IMU and Wheel Sensor Data

As described above, the autonomous vehicle can implement dead reckoning techniques to transform accelerations and angular velocities received from the IMU (and wheel displacement data received from the wheel sensor) into motion-related values in a particular domain for comparison to similar motion-related values derived from concurrent LIDAR frames. For example, the controller can transform raw inertial data received from the IMU over a period of time and stored in the buffer (e.g., approximately 100 data packets of longitudinal accelerations and angular velocities received from the IMU over a period of 200 milliseconds) into a sequence of longitudinal velocities at a reference point on the autonomous vehicle, as described below.

9.2 LIDAR Frames

The controller similarly transforms a set of LIDAR frames received from the LIDAR sensor over a similar period of time into motion-related values in a particular domain for comparison to motion-related values derived from concurrent inertial data.

In one example, the controller: implements computer vision (e.g., object detection), artificial intelligence, or other perception techniques to detect and identify types of objects in both a current LIDAR frame and a preceding LIDAR frame received from the LIDAR sensor; isolates immutable objects—such as building, traffic signs, road and lane markers, road barriers, etc.—in these LIDAR frames; implements object tracking techniques to link like immutable objects or surfaces detected in the current and preceding LIDAR frames; and characterizes changes in positions of these immutable objects or surfaces from the preceding LIDAR frame to the current LIDAR frame. The controller can then transform these changes in position of immutable objects or surfaces between these LIDAR frames into a quantitative change in the position (e.g., along the longitudinal, lateral, and vertical axes of the autonomous vehicle) and orientation (e.g., pitch, yaw, and roll) of a reference point on the autonomous vehicle over an interval of time between these two LIDAR frames, such as based on known intrinsic properties of the LIDAR sensor and a known offset from the LIDAR sensor to a reference point on the autonomous vehicle.

In this example, by assuming constant latency of LIDAR frame generation and transmission to the controller between the preceding and current LIDAR frames, the controller can also calculate: an average velocity of the autonomous vehicle in a longitudinal direction; an average velocity of the autonomous vehicle in the lateral direction; and/or an average angular velocity of the autonomous vehicle about its yaw axis during the time interval between the preceding and current LIDAR frames based on changes in position of immutable objects or surfaces between these LIDAR frames.

The autonomous vehicle can implement similar methods to: detect and track immutable objects across multiple consecutive LIDAR frames; calculate average longitudinal velocities, lateral velocities, and/or angular velocities about its yaw axis; and then derive average longitudinal accelerations, lateral accelerations, and/or angular accelerations about its yaw axis between instances that these LIDAR frames were recorded. The autonomous vehicle can thus interpolate (or extrapolate) average velocities and/or accelerations of the autonomous vehicle in various domains during discrete intervals between LIDAR frames received from the LIDAR sensor based on changes in positions of like, immutable objects or surfaces detected in a sequence of LIDAR frames.

Therefore, in the foregoing example, the controller can identify types of objects in the field around the autonomous vehicle and identify immutable objects directly from detected types of these objects. Alternatively, the controller can: match objects in a previous LIDAR frame recorded at a previous time to known objects depicted in a localization map to isolate a constellation of immutable objects in the field; track these immutable objects into a current LIDAR frame recorded at a current time; and then derive a longitudinal velocity and an angular velocity of the LIDAR sensor over a calibration interval between the previous and current times based on changes in position of these immutable objects detected in the previous and current LIDAR frames. The controller can repeat this process for multiple recent, consecutive LIDAR frames—such as the last five LIDAR frames up to the current LIDAR frame—to calculate a sequence of (e.g., four) longitudinal and angular velocities at the LIDAR sensor over this period of time. The controller can then implement a LIDAR sensor transform—representing a known offset between the LIDAR sensor and a reference point on the autonomous vehicle (e.g., the IMU)— to transform this sequence of longitudinal and angular velocities at the LIDAR sensor into a LIDAR-based sequence of longitudinal velocities at the reference point in Block S132. The controller can similarly implement an IMU transform—representing a known offset between the IMU and the reference point on the autonomous vehicle—to transform inertial data received from the IMU over a similar period of time into an IMU-based sequence of longitudinal velocities at the reference point in Block S130.

Yet alternatively, by tracking objects over preceding LIDAR frames, the controller can identify a constellation of objects exhibiting null (or approximately null) absolute velocities and then implement the foregoing methods and techniques to derive velocities of the LIDAR sensor over multiple LIDAR frames based on changes in positions of these (approximately) static objects in these LIDAR frames. For example, the controller can: detect a first constellation of objects in a preceding LIDAR frame; detect a second constellation of objects in a current LIDAR frame; estimating relative velocities of the second constellation of objects at the current time based on differences between the first constellation of objects and the second constellation of objects; estimate the current velocity of the reference point on the autonomous vehicle based on current inertial data; and estimate absolute velocities of the second constellation of objects at the current time based on relative velocities of the second constellation of objects and the current velocity of the reference point on the autonomous vehicle. (The controller can also filter the second constellation of object to include only static objects at a minimum distance from the autonomous vehicle, such as to include only static object at least 50 meters from the LIDAR sensor, as depicted in the second LIDAR frame, in order to reduce noise or localization error of this constellation of objects over multiple LIDAR frames.) The controller can then: select a particular object—in the first and second constellations of objects— characterized by a null velocity at the preceding and current times (and at the minimum distance from the LIDAR sensor during this period); and derive a longitudinal velocity of the LIDAR sensor (and then the reference point on the autonomous vehicle) between the initial time and the current time based on a change in position of the particular object from the previous LIDAR frame to the current LIDAR frame. In this example, the controller can also implement this process in parallel or series for multiple static objects—in the first and second constellations of objects—to estimate or converge on a velocity of the LIDAR sensor (and then the reference point) over this period of time. The controller can repeat this process for earlier, consecutive LIDAR frames and/or retrieve past velocities of the LIDAR sensor (and reference point) for these earlier periods.

However, the controller can implement any other method or technique to derive: a quantitative motion characteristic of the autonomous vehicle (or the LIDAR sensor or reference point) from data contained in a sequence of LIDAR frames in Block S132; and a quantitative motion characteristic of the autonomous vehicle (or the LIDAR sensor or reference point)—in the same domain—from data contained in a sequence of inertial data received from the IMU over a similar period of time in Block S130.

9.3 Comparison

As described above, the autonomous vehicle can then compare: an IMU-derived velocity of the autonomous vehicle in the longitudinal direction over a period of time (e.g., 200 milliseconds up to the current time); and a LIDAR-derived velocity of the autonomous vehicle in the longitudinal direction over this same period of time (e.g., ten velocity values derived from a contiguous sequence of eleven LIDAR frames recorded by the LIDAR sensor operating at a frame rate of 20 Hz over the most-recent 200-millisecond interval). With the IMU-derived longitudinal velocities as a reference, the autonomous vehicle can: select an offset time test value within a preset range (e.g., −10 milliseconds in a range from −10 milliseconds to +10 milliseconds with 1-milliseconds steps); shift the LIDAR-derived longitudinal velocities along the IMU-derived longitudinal velocities by the offset time test value; calculate an area between the IMU-derived longitudinal velocities and the adjusted LIDAR-derived longitudinal velocities; and repeat this process for each other offset time test value in the preset range. The autonomous vehicle can then store an offset time test value—in this preset range—that minimizes the area between the IMU-derived longitudinal velocities and the adjusted LIDAR-derived longitudinal velocities as "$d_{LIDAR\_IMU,i,initial}$."

In a similar example, the controller can: generate a first plot of longitudinal velocities at the reference point derived from inertial data collected during the current period of time (e.g., the current 200 milliseconds of inertial data stored in the buffer); generate a second plot of velocities at the reference point derived from LIDAR frames data collected during this current period of time (e.g., consecutive LIDAR frames stored in the buffer and spanning the current 200 milliseconds); sequentially shift the first plot relative to the second plot in time by a predefined set of test times (e.g., −0.010, −0.008, −0.006, . . . 0.000, +0.002, +0.004, . . . , +0.010 seconds); calculate areas between the first plot and the second plot for each of these test times; and finally store a particular test time that minimizes the area between the first plot and the second plot as the current LIDAR sensor offset time—or $d_{LIDAR\_IMU,i,initial}$—in Block S124.

(The autonomous vehicle can also check $d_{LIDAR\_IMU,i,initial}$ by implementing similar methods and techniques to calculate a $d_{LIDAR\_IMU,i,initial}$ value from IMU- and LIDAR-derived longitudinal accelerations, angular velocities about the autonomous vehicle's yaw axis, angular accelerations about the autonomous vehicle's yaw axis, and/or other data types derived from the current LIDAR and inertial data stored in the buffer. The autonomous vehicle can then combine (e.g., average) these $d_{LIDAR\_IMU,i,initial}$ values. Alternatively, the autonomous vehicle can calculate $d_{LIDAR\_IMU,i,initial}$ from one or more data types other than longitudinal velocity of the autonomous vehicle.)

However, the autonomous vehicle can implement any other method or technique to calculate a correlation between IMU- and LIDAR sensor-derived motion data over the duration of the buffer.

9.4 Final Offset Time: IMU and LIDAR Sensor

The autonomous vehicle can then: access a final offset time value $d_{LIDAR\_IMU,i-1,final}$ calculated during a preceding calibration cycle; calculate a combination of the preceding final offset time value $d_{LIDAR\_IMU,i-1,final}$ and the current offset time test value $d_{LIDAR\_IMU,i,initial}$, such as a weighted average with the former weighted more than the latter, as described above; and store this weighted average as the final offset time value $d_{LIDAR\_IMU,i,final}$ for the current calibration cycle.

In a similar example, the controller can: find or calculate a particular offset time test value that minimizes the area between IMU-derived velocities and LIDAR-based velocities for the current time period (or "$d_{WS\_LiDAR,i,initial}$"); combine this particular offset time with previous offset times found or calculated during multiple (e.g., five) previous calibration intervals, such as a weighted average or other linear combination of these offset times, including assigning the greatest weight to the current offset time $d_{WS\_LiDAR,i,initial}$; and then store this combination of offset times as the final offset time—or $d_{WS\_IMU,i,final}$—for the current calibration interval.

(Alternatively, the autonomous vehicle can directly store the current offset time test value $d_{LIDAR\_IMU,i,initial}$ for the current calibration cycle as $d_{LIDAR\_IMU,i,final}$.)

10. Calibration Error

In one variation shown in FIGS. 2 and 3, the controller can: detect calibration errors between IMU, wheel sensor, and LIDAR sensor signals; and selectively respond to these errors based on magnitudes, frequencies, and/or combinations of these errors across these sensor domains.

10.1 No Solution: IMU and Wheel Sensor

In one implementation, the controller may fail to identify a sufficient solution for temporal offset between IMU and wheel sensor signals if no sufficiently-strong correlation between accelerations—at the measured wheel—derived from inertial and wheel sensor data over a calibration interval is thus detected within the preset range of temporal offsets described above. Such failure may indicate a malfunctioning IMU and/or a malfunctioning wheel sensor; therefore, the controller can discard results of this calibration cycle and implement a preceding final offset time $d_{WS\_IMU,i-1,final}$ to temporally calibrate wheel sensor and IMU signals responsive to such failure.

Furthermore, if the autonomous vehicle fails to identify a solution for temporally-aligning IMU and wheel sensor signals beyond a threshold number of consecutive calibration cycles or if the controller fails to converge on a solution for temporal offset between the IMU and wheel sensor signals in more than a threshold proportion of recent calibration cycles (e.g., 80% of the last 100 calibration cycles) recent, the controller can predict a malfunctioning IMU and/or a malfunctioning wheel sensor. Accordingly, the controller can: automatically prompt an occupant inside the autonomous vehicle to assume manual control; automatically prompt a remote operator to assume remote manual control of the autonomous vehicle and/or to investigate this failure; or autonomously execute a pullover routine to navigate to a stop.

10.2 No Solution: IMU and LIDAR Sensor

Similarly, the controller may fail to identify a sufficient solution for temporal offset between IMU and LIDAR signals if no sufficiently-strong correlation between velocities—at the reference point—derived from inertial data and LIDAR images over a calibration interval is thus detected within the preset range of temporal offsets described above. Such failure may indicate a malfunctioning IMU and/or a malfunctioning wheel sensor; therefore, the controller can discard results of this calibration cycle and implement a preceding final offset time $d_{WS\_LiDAR,i-1,final}$ to temporally calibrate wheel sensor and IMU signals responsive to such failure.

Furthermore, if the autonomous vehicle fails to identify a solution for temporally-aligning inertial data and LIDAR frames beyond a threshold number of consecutive calibration cycles or if the controller fails to converge on a solution for temporal offset between inertial data output by the IMU and LIDAR frames output by the LIDAR sensor in more than a threshold proportion of recent calibration cycles (e.g., 80% of the last 100 calibration cycles), the controller can predict a malfunctioning IMU and/or a malfunctioning LIDAR sensor. Accordingly, the controller can: automatically prompt an occupant inside the autonomous vehicle to assume manual control; automatically prompt a remote operator to assume remote manual control of the autonomous vehicle and/or to investigate this failure; or autonomously execute a pullover routine to navigate to a stop.

10.2 Offset Time Variance and Deviation

In another implementation, the controller can monitor variance between wheel sensor offset times over multiple consecutive calibration cycles and selectively flag the IMU or wheel sensor based on this variance.

In one example, if the current wheel sensor offset time for the current calibration cycle deviates from a previous, nominal, or historical average wheel sensor offset time and if the current LIDAR sensor offset time for the current calibration cycle approximates (i.e., differs minimally from) the previous, nominal, or historical average LIDAR sensor offset time, the controller can: predict communication failure of the wheel sensor during or around the current calibration cycle; confirm communication with the LIDAR sensor during this time; and then dispatch the autonomous vehicle for maintenance or repair. Similarly, if the current LIDAR sensor offset time instead deviates from the previous, nominal, or historical average LIDAR sensor offset time and if the current wheel sensor offset time approximates the previous, nominal, or historical average wheel sensor offset time, the controller can: confirm communication with the inertial sensor during the current period of time; predict communication failure with the LIDAR sensor during this time; and disable autonomous operation of the autonomous vehicle. In particular, the controller can selectively escalate severity of response to offset time deviations based on resolution of data output by corresponding sensors (i.e., high-resolution 3D depth maps output by the LIDAR sensor, low-resolution angular display data output by the wheel sensor).

In another example, if the controller determines that the current wheel sensor offset time—calculated during the current calibration cycle—differs from the previous wheel sensor offset time (or a running or weighted average of past wheel sensor offset times) by less than a threshold difference, the controller can predict that the IMU and wheel sensor and communications with these sensors are operating normally (or that at least sensing and communication parameters of the IMU and the wheel sensor that affect latency are operating normally).

Similarly, if the controller determines that the current LIDAR sensor offset time—calculated during the during calibration cycle—differs from the previous LIDAR sensor offset time (or a running or weighted average of past LIDAR sensor offset times) by less than a threshold difference, the controller can predict that the IMU and LIDAR sensor and communications with these sensors are operating normally (or that at least sensing and communication parameters of the IMU and the LIDAR sensor that affect latency are operating normally).

10.2.1 LIDAR Sensor Offset Time Variance

However, if the controller determines that the current wheel sensor offset time differs from the previous or average wheel sensor offset time by less than a threshold difference but that the current LIDAR sensor offset time differs from the previous or average LIDAR sensor offset time by more than the threshold difference (e.g., 40%), the controller can: predict that the IMU and wheel sensor are exhibiting expected latency and therefore operating normally; and predict that the LIDAR sensor is operating uncharacteristically and therefore may be malfunctioning. Because 3D scan data collected by the LIDAR sensor may no longer be trustworthy but may represent a significant proportion of the autonomous vehicle's sensible area, the controller can: flag the LIDAR sensor and the IMU for possible malfunction; and trigger the autonomous vehicle to transition from autonomous operation to manual control, such as remote control by a remote operator via a wireless network. Alternatively, the controller can withhold this error flag until the difference between current and past LIDAR sensor offset times fails to return to a low-variance characteristic for a minimum period of time (e.g., two seconds) or minimum distance traversed by the autonomous vehicle (e.g., five meters).

Additionally or alternatively, if the controller predicts failure of the LIDAR sensor, detects greater variance in latency of data output by the LIDAR sensor, or otherwise assigns reduced confidence (or "trustworthiness") to LIDAR frames output by the LIDAR sensor, the controller can selectively discard (i.e., exclude from the perception pipeline described below) or deprioritize concurrent LIDAR frames. Thus, rather than estimate absolute location or positional changes of the autonomous vehicle by tracking features in consecutive LIDAR frames during periods of relatively large variance in LIDAR sensor offset times, relatively large deviation from a nominal or average LIDAR sensor offset time, or failure to converge on LIDAR sensor offset times within a permissible range, the controller can instead: estimate changes in position of the autonomous vehicle during these periods of time based on the concurrent internal data output by the IMU (e.g., by implementing dead-reckoning techniques); and verify these estimated changes in position of the autonomous vehicle based on concurrent data output by the wheel sensor (or vice versa).

10.2.2 Wheel Sensor Offset Time Variance

Similarly, if the controller determines that the current LIDAR sensor offset time differs from the previous or average LIDAR sensor offset time by less than the threshold difference but that the current wheel sensor offset time differs from the previous or average wheel sensor offset time by more than the threshold difference, the controller can: predict that the IMU and LIDAR sensor are exhibiting expected latency and therefore operating normally; and predict that the wheel sensor is operating uncharacteristically and therefore may be malfunctioning. Though the signal output by the wheel sensor may no longer be trustworthy, this signal may also be redundant in light of signals output by the IMU and the LIDAR sensor, and the controller may still be capable of autonomously navigating the autonomous vehicle without wheel sensor data from the wheel sensor. Therefore, the controller can: flag the wheel sensor for possible malfunction; and dispatch the autonomous vehicle to a maintenance facility for repair.

Additionally or alternatively, if the controller predicts failure of the wheel sensor, detects greater variance in latency of data output by the wheel sensor, or otherwise assigns reduced confidence (or "trustworthiness") to wheel sensor data, the controller can selectively discard (i.e., exclude from the perception pipeline described below) or deprioritize concurrent wheel sensor data. Thus, rather than verify inertial data with concurrent wheel sensor data during periods of relatively large variance in wheel sensor offset times, relatively large deviation from a nominal or average wheel sensor offset time, or failure to converge on wheel sensor offset times within a permissible range, the controller can instead: estimate changes in position of the autonomous vehicle during these periods of time based on changes in position of objects tracked across LIDAR frames recorded during these periods; and verify these estimated changes in position of the autonomous vehicle based on concurrent inertial data output by the IMU (or vice versa).

10.2.3 IMU Latency Variance

Furthermore, if the controller determines that the current LIDAR sensor offset time differs from the previous or average LIDAR sensor offset time by more than the threshold difference and that the current wheel sensor offset time differs from the previous or average wheel sensor offset time by more than the threshold difference, the controller can predict that the and LIDAR and wheel sensors are exhibiting expected latency and therefore operating normally but that the IMU is operating uncharacteristically and therefore may be malfunctioning if the variance or deviation of the current LIDAR and wheel sensor offset times are large but substantially similar. Subsequently, though signals output by the IMU may no longer be trustworthy, these signals may also be redundant in light of signals output by the LIDAR and wheel sensors, and the controller may still be capable of autonomously navigating the autonomous vehicle without inertial data from the IMU. Therefore, the controller can: flag the IMU for possible malfunction; and dispatch the autonomous vehicle to a maintenance facility for repair.

Additionally or alternatively, if the controller predicts failure of the IMU sensor, detects greater variance in common latency of data output by the LIDAR and wheel sensors (which may correlate with latency of the IMU specifically), or otherwise assigns reduced confidence (or "trustworthiness") to inertial data, the controller can selectively discard (i.e., exclude from the perception pipeline described below) or deprioritize concurrent inertial data. Thus, rather than verify wheel sensor data with concurrent inertial sensor data during periods of relatively large variance in IMU offset times, relatively large deviation from a nominal or average IMU offset time, or failure to converge on IMU offset times within a permissible range, the controller can instead: estimate changes in position of the autonomous vehicle during these periods of time based on changes in position of objects tracked across LIDAR frames recorded during these periods; and verify these estimated changes in position of the autonomous vehicle based on concurrent wheel sensor output by the wheel sensor (or vice versa).

11. Time Offset Verification

One variation, of the method S100 includes; Block S126, which recites, in response to the first wheel sensor offset time approximating an initial wheel sensor offset time calculated prior to the first time, verifying operation of the inertial sensor during the first period of time; and Block S136, which recites, in response to the first LIDAR sensor offset time approximating an initial LIDAR sensor offset time calculated prior to the first time, verifying operation of the LIDAR sensor during the first period of time.

Generally, in Block S126, if the controller successfully converges on a wheel offset time within a preset range described above, if this wheel offset time differs from a nominal or historical average wheel offset time by less than a threshold difference, and/or if variance in wheel offset time up to the current calibration cycle exhibits less than a threshold variance, the controller can thus verify that the wheel sensor and the IMU are operating normally (or that at least sensing and communication parameters of the IMU and the wheel sensor that affect latency are operating normally).

Similarly, in Block S136, if the controller successfully converges on a LIDAR offset time within a preset range described above, if this LIDAR offset time differs from a nominal or historical average LIDAR offset time by less than a threshold difference, and/or if variance in LIDAR offset time up to the current calibration cycle exhibits less than a threshold variance, the controller can thus verify that the LIDAR sensor and the IMU are operating normally (or that at least sensing and communication parameters of the IMU and the LIDAR sensor that affect latency are operating normally).

Responsive to verifying operation of the inertial sensor, the LIDAR sensor, and the wheel sensor during the current calibration cycle, the controller can: isolate and aggregate concurrent inertial data, a LIDAR frame, and wheel sensor data based on the current LIDAR and wheel sensor offset times in Block S140; elect a next navigational action based on these inertial data, the current LIDAR image, and these wheel sensor data; and then autonomously execute this next navigational action.

12. Temporal Realignment of IMU, Wheel Sensor, and LIDAR Frames

Block S140 of the method S100 recites generating a first representation of the autonomous vehicle and a field around the autonomous vehicle at the first time by compiling: the first LIDAR frame (i.e., the last LIDAR frame received from the LIDAR sensor); a first inertial sensor datum, in the first sequence of inertial data, associated with a first inertial sensor receipt time offset from the first time by approximately the first LIDAR sensor offset time; and a first wheel sensor datum, in the first sequence of angular position changes, associated with a first wheel sensor receipt time offset from the first inertial sensor receipt time by approximately the first wheel sensor offset time. (Block S140 can similar recite compiling a current LIDAR frame, a particular datum output by the IMU sensor and associated with a time offset from the LIDAR frame by approximately the LIDAR sensor offset time, and a particular datum output by the wheel sensor and associated with a time offset from the particular datum output by the IMU sensor by approximately the wheel sensor offset time in Block S140.

Generally, in Block S140, if the autonomous vehicle calculates time offsets that sufficiently align the wheel-sensor-derived accelerations to the IMU-derived accelerations and that sufficiently align the wheel-sensor-derived accelerations to the IMU-derived accelerations, the autonomous vehicle can implement these time offsets to temporally calibrate current IMU, wheel sensor, and LIDAR sensor data.

Figure 4:
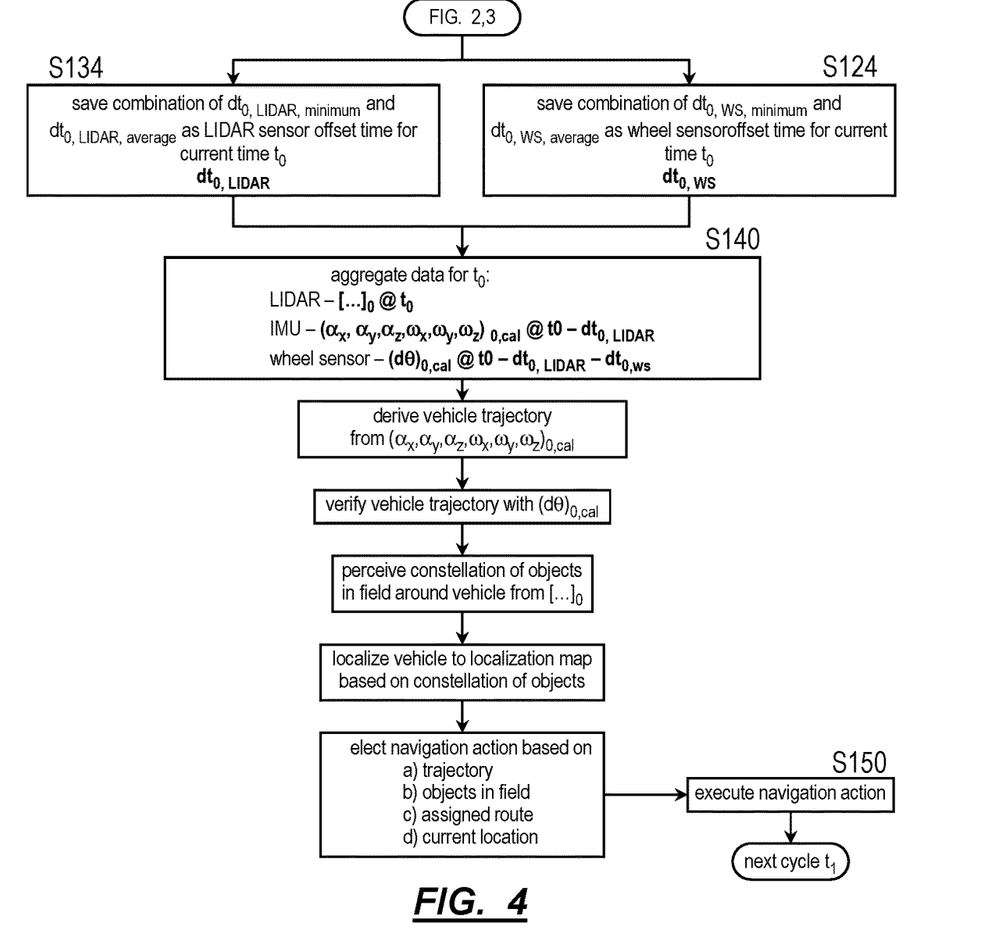
FIG. 4 is a flowchart representation of one variation of the method.
Figure 5:
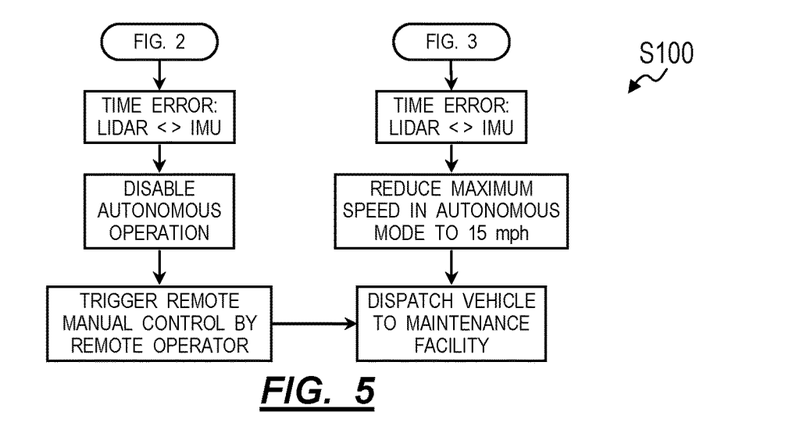
FIG. 5 is a flowchart representation of one variation of the method.

In one implementation shown in FIG. 4, the autonomous vehicle: selects the current LIDAR frame; subtracts $d_{LIDAR\_IMU,i,final}$ from a timestamp paired with this current LIDAR frame to calculate $t_{LIDAR\_IMU,i}$; retrieves a past stored inertial data packet paired with a timestamp nearest $t_{LIDAR\_IMU,i}$; retrieves past stored wheel sensor data paired with a timestamp nearest $[t_{LIDAR\_IMU,i} - t_{WS\_IMU,i}]$; and packages these LIDAR, IMU, and wheel sensor data as a temporally-calibrated representation of the motion of the autonomous vehicle and a state of the environment around the autonomous vehicle over a time interval approaching a singular instant in time.

Alternately, in the foregoing implementation, the autonomous vehicle can: interpolate acceleration and angular velocity values at $t_{LIDAR\_IMU,i}$ from acceleration and angular velocity values in inertial data packets—stored in the buffer—paired with timestamps near $t_{LIDAR\_IMU,i}$; and similarly interpolate a wheel speed value at $[t_{LIDAR\_IMU,i} - t_{WS\_IMU,i}]$ from wheel sensor data stored in the buffer.

For the autonomous vehicle that samples the IMU and wheel sensor faster than the LIDAR sensor, the autonomous vehicle can separately temporally calibrate wheel sensor data to inertial data when a LIDAR sensor is not currently available. For example, upon calculating $d_{WS\_IMU,i,final}$, the autonomous vehicle can: select a current wheel sensor datum; subtract $d_{WS\_IMU,i,final}$ from the timestamp paired with this current wheel sensor datum to calculate $t_{WS\_IMU,i}$; retrieve a past stored inertial data packet—stored in the buffer—paired with a timestamp nearest $t_{WS\_IMU,i}$ (or interpolate acceleration and angular velocity values at $t_{WS\_IMU,i}$ from inertial data stored in a buffer); and pair these stored acceleration and angular velocity values with the current wheel sensor datum to form a temporally-calibrated packet of wheel sensor and inertial data.

The autonomous vehicle can continue to implement these $d_{WS\_IMU,i,final}$ and $d_{LIDAR\_IMU,i,final}$ values to temporally calibrate subsequent wheel sensor and LIDAR frames to inertial data until the autonomous vehicle executes a next calibration routine.

13. Other Sensors

The autonomous vehicle can implement these methods and techniques to temporally calibrate outputs of other types of sensors in or on the autonomous vehicle, such as relative to inertial data output by the IMU.

The system can also implement these methods and techniques to calculate time offsets from generation of sensor data in a reference data stream (e.g., inertial data) to generation of sensor data from a second data stream of another type (e.g., a 2D color camera, a RADAR distance sensor, etc.) in the autonomous vehicle. For example, the autonomous vehicle can: include a color 2D camera that outputs 2D color photographic images; implement structure from motion techniques to derive a longitudinal velocity (and/or an angular velocity about the autonomous vehicle's yaw axis, etc.) from a sequence of 2D images output by the 2D camera (e.g., over a sequence of 100 milliseconds) up to the current time; compare the camera-derived longitudinal velocities to IMU-derived longitudinal velocities over this time period; calculate a particular time offset that reduces a difference between the camera-derived longitudinal velocity to the IMU-derived longitudinal velocity; and pair a 2D color image with an output by the IMU (and the LIDAR sensor, the wheel sensors, etc.) based on this particular time offset, thereby temporally calibrating the output of the 2D color camera to the output of the IMU—and therefore to outputs of other sensors in the autonomous vehicle, which the autonomous vehicle also calibrates to outputs of the IMU.

In the foregoing implementation, the autonomous vehicle can therefore further include a color camera facing outwardly from the autonomous vehicle and configured to output 2D color images of a section of the field around the autonomous vehicle, such as at sampling rate of 24 Hz (e.g., between sampling rates of 50 Hz and 20 Hz implemented by the LIDAR sensor and the wheel sensor, respectively). For example, the controller can: record a sequence of color images output by the color camera—at a sampling rate between the sampling rates of the LIDAR sensor and the wheel sensors—over a period of time; detect constellations of objects in a current sequence of color images; track these objects throughout this current sequence of color images; and derive a set of longitudinal velocities of the reference point on the autonomous vehicle during this period of time based on changes in position of static objects identified in the constellation of objects, similar to Block S134 described above. The controller can then calculate a camera offset time that approximately minimizes a difference between this set of camera-based longitudinal velocities and a concurrent set of IMU-based longitudinal velocities derived in Block S132, such as calculating a time shift that minimizes an area between the set of camera-based longitudinal velocities and the set of IMU-based longitudinal velocities. If this camera offset time falls within a preset temporal variance range and/or differs from a nominal or historical camera offset time by less than a threshold difference, the controller can verify operation of the color camera and/or verify communication with the color camera. The controller can also select one or a set of color images that temporally align with a current LIDAR image or otherwise combine temporally-aligned color images, a LIDAR frame, internal data, and wheel sensor data into a representation of the autonomous vehicle and the field around the autonomous vehicle at the current time in Block S140. For example, after selecting a current LIDAR frame associated with a current time, the controller can: calculate a current LIDAR sensor offset time as described above in Block S134; retrieve inertial sensor data associated with a previous inertial sensor receipt times that are offset from the current time by the current LIDAR sensor time; retrieve a particular color image, in a current sequence of color images received from the color camera, associated with a receipt time offset from the previous inertial sensor receipt time by approximately the first color camera offset time; and combine these LIDAR, color, and inertial data into a current representation of the autonomous vehicle and the field around the autonomous vehicle at the current time in Block S140. The autonomous vehicle can then perceive the field around the autonomous vehicle, elect a next navigational action, and execute this next navigational action based on this current representation of the autonomous vehicle and the field around the autonomous vehicle at the current time, as described above.

However, the autonomous vehicle can implement any other method or technique to temporally calibrate these sensors in the autonomous vehicle, and the autonomous vehicle can implement these methods to calibrate sensors in the autonomous vehicle relative to a reference data stream of any other type (e.g., a RADAR sensor, a proximity sensor, a fixed LIDAR sensor).

13. Localization, Perception, and Path Planning

The autonomous vehicle can then: elect a next navigational action based on the first sequence of inertial data and the first LIDAR frame; and autonomously execute the next navigational action in Block S150. Generally, in Block S150, the autonomous vehicle can: access temporally-aligned inertial, LIDAR, and wheel sensor data aggregated in Block S140; pass these temporally-aligned data sensor data through a perception pipeline to derive motion and states of the autonomous vehicle and objects in the field around the autonomous vehicle; verify these derived motion and state values based on redundancy between these inertial, LIDAR, and wheel sensor data; predict accelerator, brake, and steering positions (e.g., a next navigational action) that maintain the autonomous vehicle along or near a planned route and that limit risk of collision with objects in the field around the autonomous vehicle; and then automatically implement these accelerator, brake, and steering positions (i.e., autonomously execute the next navigational action), as shown in FIG. 4.

In particular, the autonomous vehicle can regularly implement the foregoing methods and techniques to temporally calibrate sensors throughout the autonomous vehicle, such as once per receipt of a LIDAR frame from the LIDAR sensor or at a rate of 10 Hz, etc., during operation.

Once the autonomous vehicle has temporally calibrated outputs of these sensors, the autonomous vehicle can fuse these sensor data to form a more complete, robust model of the autonomous vehicle's motion and the state of the environment nearby. For example, the autonomous vehicle can implement artificial intelligence techniques: to merge these temporally-calibrated sensor data and a localization map into a geospatial location and orientation of the autonomous vehicle; and to merge these temporally-calibrated sensor data and a perception engine to detect and identify immutable and mutable objects in the vicinity of the autonomous vehicle and the trajectories of these objects relative to the autonomous vehicle; and to calculate accelerator, brake, and steering positions to maintain the autonomous vehicle along a planned navigation path.

In one implementation, after aggregating temporally-aligned inertial, LIDAR, and wheel sensor data in Block S140 based on the current LIDAR and wheel offset times, the autonomous vehicle: calculates the current velocity of the reference point on the autonomous vehicle based on these inertial data; implements artificial intelligence, computer vision, regression, and/or other methods and techniques to detect a first constellation of objects in the current LIDAR frame; similarly detects a previous constellation of objects in a preceding LIDAR frame; estimates relative velocities of the first constellation of objects in the current LIDAR frame based on differences between the preceding and current constellations of objects; and estimates absolute velocities of the current constellation of objects at the current time based on relative velocities of the current constellation of objects and the current velocity of the reference point on the autonomous vehicle. The autonomous vehicle then: elects a next navigational action—in near real-time—to avoid future collision with the current constellation of objects based on absolute velocities of the current constellation of objects and the current velocity of the reference point on the autonomous vehicle at the current time; and then manipulates actuators in the autonomous vehicle to autonomously execute this navigational action.

The autonomous vehicle can then repeat the foregoing process responsive to receipt of each subsequent LIDAR frame from the LIDAR sensor. The autonomous vehicle can also execute the foregoing process simultaneously for multiple LIDAR sensors arranged on the autonomous vehicle (and for multiple IMUs and/or wheel sensors integrated into the autonomous vehicle). The autonomous vehicle can also implement similar methods and techniques to temporally calibrate two sensors of the same type—such as two LIDAR sensors—relative to inertial data output by the IMU and can temporally align outputs of these like sensors accordingly, such as by identifying and pairing two temporally-adjacent LIDAR frames output by two distinct LIDAR sensors on the autonomous vehicle at similar times verified via inertial data output by the IMU.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for temporally calibrating sensor streams, the method comprising:
    determining a first set of longitudinal accelerations at a wheel of a vehicle using inertial data output by an inertial sensor over a period of time;
    determining a second set of longitudinal accelerations at the wheel using a sequence of angular position changes output by a wheel sensor corresponding to the wheel over the period of time;
    calculating a wheel sensor offset time by minimizing a difference between the first set of longitudinal accelerations and the second set of longitudinal accelerations; and
    determining a temporal alignment of a first data stream output by the inertial sensor and a second data stream output by the wheel sensor based on a comparison of the wheel sensor offset time to an initial wheel sensor offset time.

2. The method of claim 1, wherein at least one of the wheel sensor or the inertial sensor is calibrated based on the temporal alignment.

3. The method of claim 1, wherein the wheel sensor offset time is calculated by shifting a first plot relative to a second plot by a set of test times and identifying a particular test time in the set of test times that minimizes an area between the first plot and the second plot, the first plot corresponding to the first set of longitudinal accelerations and the second plot corresponding to the second set of longitudinal accelerations.

4. The method of claim 1, further comprising:
    triggering a vehicle mode transition for the vehicle based on the temporal alignment.

5. The method of claim 4, wherein the vehicle mode transition includes a transition from an autonomous mode to a manual mode.

6. The method of claim 1, further comprising:
    triggering a change in operation of the vehicle based on the temporal alignment.

7. The method of claim 6, wherein the change in operation includes at least one of reducing speed or stopping.

8. The method of claim 1, further comprising:
    detecting an operation issue of at least one of the wheel sensor or the inertial sensor based on the temporal alignment.

9. The method of claim 8, wherein a maintenance vehicle is dispatched in response to detection of the operation issue.

10. One or more tangible non-transitory computer-readable storage media storing computer-executable instructions for performing a computer process on a computing system, the computer process comprising:
    determining a first set of longitudinal velocities of a reference point corresponding to a vehicle using inertial data output by an inertial sensor over a period of time between an initial time and a first time;
    determining a second set of longitudinal velocities of the reference point based on features detected in an initial LIDAR frame output by a LIDAR sensor at the initial time and features detected in a first LIDAR frame output by the LIDAR sensor at the first time;
    calculating a LIDAR sensor offset time by minimizing a difference between the first set of longitudinal velocities and the second set of longitudinal velocities; and
    determining a temporal alignment of a first data stream output by the inertial sensor and a second data stream output by the LIDAR sensor based on a comparison of the LIDAR sensor offset time to an initial LIDAR sensor offset time.

11. The one or more tangible non-transitory computer-readable storage media of claim 10, the computer process further comprising:
    estimating a velocity of one or more objects in a scene around the vehicle based on the temporal alignment.

12. The one or more tangible non-transitory computer-readable storage media of claim 10, the computer process further comprising:
    determining a current position of the vehicle based on the temporal alignment.

13. The one or more tangible non-transitory computer-readable storage media of claim 10, the computer process further comprising:
    verifying an operation of at least one of at least one of the LIDAR sensor or the inertial sensor based on the temporal alignment.

14. The one or more tangible non-transitory computer-readable storage media of claim 10, the computer process further comprising:

verifying an operation of the LIDAR sensor by comparing the LIDAR sensor offset time to an initial LIDAR sensor offset time.

15. The one or more tangible non-transitory computer-readable storage media of claim 10, the computer process further comprising:
    detecting one or more objects in a scene around the vehicle based on the temporal alignment.

16. One or more tangible non-transitory computer-readable storage media storing computer-executable instructions for performing a computer process on a computing system, the computer process comprising:
    determining a first set of longitudinal accelerations at a wheel of a vehicle using a first sequence of data received output by a first sensor of the vehicle over a first period of time;
    determining a second set of longitudinal accelerations at the wheel using a second sequence of data output by a second sensor over the first period of time;
    calculating a first sensor offset time by minimizing a difference between the first set of longitudinal accelerations and the second set of longitudinal accelerations;
    determining a first set of longitudinal velocities of a reference point corresponding to the vehicle using a third sequence of data output by the first sensor over a second period of time between an initial time and the first time;
    determining a second set of longitudinal velocities of the reference point using a fourth sequence of data output by a third sensor over the second period of time;
    calculating a second sensor offset time by minimizing a difference between the first set of longitudinal velocities and the second set of longitudinal velocities;
    verifying an operation of the first sensor during the first period of time based on a comparison of the first sensor offset time and a first initial sensor offset time; and
    verifying an operation of the third sensor during the first period of time based on a comparison of the second sensor offset time and a second initial sensor offset time.

17. The one or more tangible non-transitory computer-readable storage media of claim 16, wherein the first sensor is an inertial sensor, the second sensor is a wheel sensor, and the third sensor is a LIDAR sensor.

18. The one or more tangible non-transitory computer-readable storage media of claim 16, the computer process further comprising:
    triggering a change in operation of the vehicle based on verification of the operation of the first sensor and the operation of the third sensor.

19. The one or more tangible non-transitory computer-readable storage media of claim 16, wherein a maintenance vehicle is dispatched to the vehicle based on verification of the operation of the first sensor and the operation of the third sensor.

20. The one or more tangible non-transitory computer-readable storage media of claim 16, the computer process further comprising:
    triggering a vehicle mode transition for the vehicle based on the temporal alignment.

* * * * *